H. SLATTER.
CARBURETER.
No. 82,359.   Patented Sept. 22, 1868.
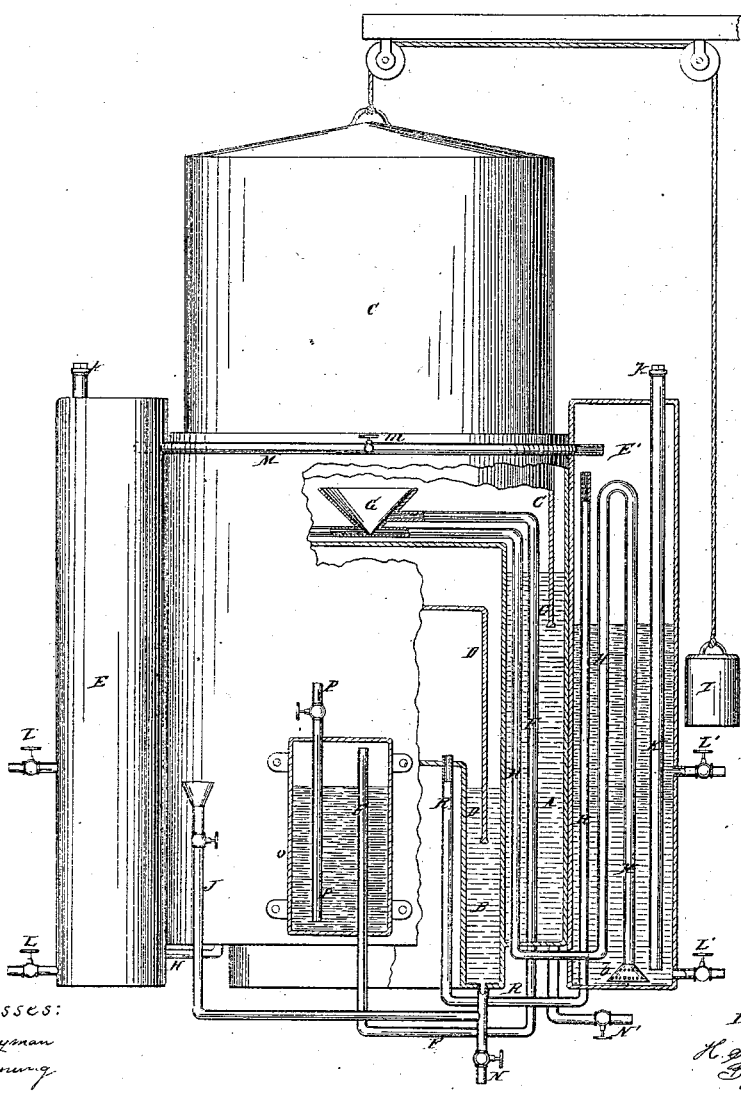

United States Patent Office.

HENRY SLATTER, OF COVINGTON, KENTUCKY.

Letters Patent No. 82,359, dated September 22, 1868.

IMPROVED CARBURETTER.

The Schedule referred to in these Letters Patent and making part of the same.

TO WHOM IT MAY CONCERN:

Be it known that I, HENRY SLATTER, of Covington, Kenton county, Kentucky, have invented a new and useful Carburetter; and I hereby declare the following to be a full, clear, and exact description thereof, reference being had to the accompanying drawing, making part of this specification.

My invention relates to the class of devices employed for volatilizing and diluting in atmospheric air the lighter products of petroleum, or of coal-oil, for the purpose of combustion; and The first part of my invention consists in a provision whereby the entering air is caused to traverse a body or stratum of water below the gasoline, or other light hydrocarbon, for the twofold purpose of insulating the inflammable gas from contact with the atmosphere, and of saturating said gas with aqueous vapor.

The second part of my invention relates to what I have called the "doctor," for maintaining a proper working-pressure of gas during the recharging of the gasometer.

The third part of my invention relates to the provision of an auxiliary carburetting-chamber.

In the accompanying drawing, a carburetting-apparatus embodying my invention is represented, partly in elevation and partly in section.

A and B are two annular tanks, of which B is of somewhat less height and diameter, and is placed concentrically within the tank A.

C and D are receivers or "gasometers," made to fit and work freely within the tanks A and B respectively.

Placed outside of the tank A, are one or more gasoline-tanks, E E'.

F is an inlet-pipe, discharging into a funnel, G, in the upper part of tank A, which funnel communicates with the lower portion of each gasoline-tank by a double siphon, H, terminating in a rose, $h$.

The receiver, C, is counterbalanced by a weight, I, or other customary device.

J is a fauceted pipe, for replenishing the tank B with water, when necessary.

K is a pipe, whose upper end has a screw-cap, $k$, and whose lower end reaches nearly to the bottom of the gasoline-tank. This pipe K is employed as a feed-tube, to introduce water and gasoline to said tank.

L L' are try-cocks, for water and gasoline respectively.

M is the service-pipe, having a stop-cock, $m$, and communicating with the upper portions of the gasoline-tanks by as many branches as there are tanks.

N N' are discharge-cocks, for the outer and inner tanks respectively.

O is an auxiliary gasoline-holder, for "enriching," when desired, the air in the principal receiver. For this purpose, said holder has a fauceted feed-pipe, P, which, entering the top of the holder, extends to near the bottom of the same, and the inverted siphon F, which, passing up within the tank A, discharges into the funnel G.

R is an inverted siphon, which serves to conduct air from the upper part of tank B to the upper part of the gasoline-tank.

The operation of my carburetter is as follows:

The tanks A and B being supplied with water in sufficient quantities to secure a joint, and the tanks E E' being supplied with water and gasoline, the receiver, C, is placed in its most elevated position, so as to make its weight effective to press air through the siphon H and rose $h$ into the lower part of the body of water in the tank E in many divided currents or bubbles, which, rising first through the water, and then through the supernatant oil, collect in the upper part of said tank in the form of a very rich hydrocarbon-gas, mingled in due proportion with atmospheric air and aqueous vapor.

The pressure in the tank E, created by the receiver, C, reacting through the inverted siphon R, operates to elevate the doctor, D, whose pressure in turn becomes effective to maintain the flow of gas on the elevation of C for another charge of air.

It will be seen that the provision of water at the delivering-end of pipe K effectually counteracts all liability to explode by a flame or spark from the outside, and this water also acts to purify the gas.

While describing the form of my invention preferred by me, I reserve the right to vary the same. For example, a succession of gasoline-tanks, discharging one into another, may be made to take the place of the additional vessel O.

I claim herein as new, and of my invention—

1. The arrangement of the water-tanks A and B, principal and auxiliary receivers C and D, pipes F, H, and R, and tank E, for the purpose set forth.

2. The tank E, adapted to contain both water and gasoline, and provided with the pipes R, H, K, and M, and cocks L L', as and for the purpose designated.

3. In combination with the subject-matter of claims 1 and 2, the auxiliary carburetting-chamber O, or its equivalent.

In testimony of which invention, I hereunto set my hand.

HENRY SLATTER.

Witnesses:
    GEO. H. KNIGHT,
    JAMES H. LAYMAN.